United States Patent
Hirayama

(10) Patent No.: US 9,387,724 B2
(45) Date of Patent: Jul. 12, 2016

(54) TIRE

(71) Applicant: SUMITOMO RUBBER INDUSTRIES, LTD., Kobe-shi, Hyogo (JP)

(72) Inventor: Michio Hirayama, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 76 days.

(21) Appl. No.: 14/283,343

(22) Filed: May 21, 2014

(65) Prior Publication Data

US 2014/0373989 A1 Dec. 25, 2014

(30) Foreign Application Priority Data

Jun. 19, 2013 (JP) ................. 2013-128698

(51) Int. Cl.
*B60C 1/00* (2006.01)
*B60C 11/00* (2006.01)
*B60C 9/18* (2006.01)
*B60C 9/20* (2006.01)

(52) U.S. Cl.
CPC ............ *B60C 1/0016* (2013.04); *B60C 9/2009* (2013.04); *B60C 2011/0033* (2013.04)

(58) Field of Classification Search
CPC .............. B60C 1/00; B60C 9/08; B60C 9/18; B60C 9/20; B60C 9/22; B60C 11/00; B60C 1/0016; B60C 2001/0075; B60C 2009/0284; B60C 2009/0269; B60C 2009/2012; B60C 2009/2016; B60C 11/0008; B60C 2011/0016; B60C 2011/0033
USPC ........... 152/209.1, 209.5, 526, 531, 535, 537, 152/905
See application file for complete search history.

(56) References Cited

U.S. PATENT DOCUMENTS

| 5,385,188 A * | 1/1995 | Kogure ................. B60C 9/2009 152/209.18 |
| 6,053,226 A * | 4/2000 | Agostini ................. B60C 19/08 152/209.4 |
| 2007/0155861 A1* | 7/2007 | Chen ......................... B60C 1/00 523/351 |
| 2011/0112212 A1* | 5/2011 | Kimura ................. B60C 1/0016 523/156 |

FOREIGN PATENT DOCUMENTS

| JP | 7-195904 A | 8/1995 |
| JP | 2004-26924 A | 1/2004 |
| JP | 2010-138272 A | 6/2010 |
| WO | WO 2008/074341 | * 6/2008 |

OTHER PUBLICATIONS

Smithers Rapra, Inc., Tire Report, Pirelli, Tire Specification No. 1444-IT, Jun. 15, 2011, pp. 1-8.

* cited by examiner

*Primary Examiner* — Eric Hug
(74) *Attorney, Agent, or Firm* — Birch, Stewart, Kolasch & Birch, LLP

(57) ABSTRACT

The present invention aims to provide a tire having improved abrasion resistance and appearance, as well as reduced rolling resistance and therefore improved fuel economy. The present invention relates to a tire including a tread, the tread containing 0.9 to 1.5% by mass of a wax, 0.9 to 1.5% by mass of an amine antioxidant, 0.3 to 1.0% by mass of a quinoline antioxidant, and a tread rubber component containing 3% by mass or more of a polybutadiene rubber, the tread having a rubber thickness between a tread groove bottom and an outermost belt-reinforcing layer of 0.1 to 2.0 mm.

3 Claims, 1 Drawing Sheet

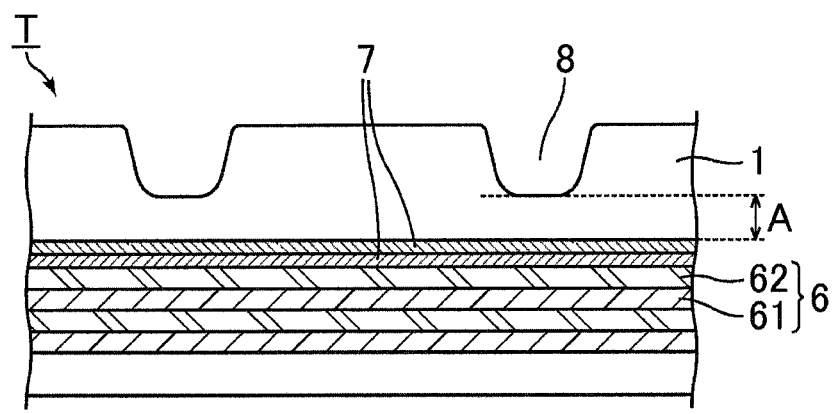

TIRE

TECHNICAL FIELD

The present invention relates to a tire.

BACKGROUND ART

Current tires are being required to have higher performance, such as improved abrasion resistance in the tire tread portion and reduced rolling resistance (improved fuel economy).

With regard to reducing rolling resistance, a reduction in the amount of rubber leads to less energy loss, resulting in improved fuel economy. However, such a reduction in the amount of rubber causes a tread rubber to have a short distance between the groove bottom and the road-contact surface. This results in reduced abrasion resistance and therefore short tire life. Further, the tread groove bottom suffers a marked stress concentration, which easily results in cracking.

Meanwhile, in order to suppress cracking at the groove bottom, the amount of wax or antioxidant can be increased (Patent Literature 1). Unfortunately, however, this method allows the wax or antioxidant to precipitate on the tire surface during storage to cause discoloration into white or brown, spoiling the appearance of the tire.

CITATION LIST

Patent Literature

Patent Literature 1: JP H07-195904 A

SUMMARY OF INVENTION

Technical Problem

The present invention aims to provide a tire having improved abrasion resistance and appearance, as well as reduced rolling resistance and therefore improved fuel economy.

Solution to Problem

Specifically, the present invention relates to a tire, including a tread, the tread containing 0.9 to 1.5% by mass of a wax, 0.9 to 1.5% by mass of an amine antioxidant, 0.3 to 1.0% by mass of a quinoline antioxidant, and a tread rubber component containing 3% by mass or more of a polybutadiene rubber, the tread having a rubber thickness between a groove bottom and an outermost belt-reinforcing layer of 0.1 to 2.0 mm.

Preferably, the amine antioxidant mainly contains N-1,3-dimethylbutyl-N'-phenyl-p-phenylenediamine.

The quinoline antioxidant is preferably a 2,2,4-trimethyl-1,2-dihydroquinoline polymer.

Preferably, the tire further includes a belt in the tread, the belt being disposed radially outward of a carcass and extending in a tire circumferential direction, the belt including a belt layer, and at least one belt-reinforcing layer disposed radially outward of the belt layer, the belt layer including a cord forming an angle with the tire circumferential direction of 15 to 30 degrees, and the belt-reinforcing layer including an organic fiber cord forming an angle with the tire circumferential direction of 0 to 5 degrees.

Advantageous Effects of Invention

According to the present invention, a tire using predetermined amounts of combined amine and quinoline antioxidants, among others, so that the amount of each antioxidant is reduced, and also having a rubber thickness between the tread groove bottom and the outermost belt-reinforcing layer of 0.1 to 2.0 mm, enables to ensure resistance to cracking at the groove bottom without spoiling the appearance of the tire and to improve fuel economy.

BRIEF DESCRIPTION OF THE DRAWINGS

FIG. 1 is an enlarged cross-sectional view showing an important part of a tread of a tire.

DESCRIPTION OF EMBODIMENTS

The tire of the present invention includes a tread containing 0.9 to 1.5% by mass of a wax, 0.9 to 1.5% by mass of an amine antioxidant, 0.3 to 1.0% by mass of a quinoline antioxidant, and a tread rubber component containing 3% by mass or more of a polybutadiene rubber. This tread has a rubber thickness between the tread groove bottom and the outermost belt-reinforcing layer of 0.1 to 2.0 mm. The use of two antioxidants allows the concentration of each antioxidant to be reduced to suppress precipitation of the antioxidants on the rubber surface. This thus makes it possible to maintain the appearance of the tire.

Any wax may be used, such as paraffin wax and rice wax. The amount of wax in the tread is 0.9 to 1.5% by mass, preferably 1 to 1.2% by mass. Less than 0.9% by mass of a wax tends to result in a reduction in resistance to cracking at the groove bottom. More than 1.5% by mass thereof tends to precipitate on the tire surface to cause whitening and thus deteriorated appearance although it can improve resistance to cracking at the groove bottom.

Any amine antioxidant may be used, and examples thereof include amine derivatives such as diphenylamine derivatives and p-phenylenediamine derivatives. Examples of the diphenylamine derivatives include p-(p-toluenesulfonylamide)-diphenylamine and octylated diphenylamine. Examples of the p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The amount of amine antioxidant in the tread is 0.9 to 1.5% by mass, preferably 1.0 to 1.2% by mass. Less than 0.9% by mass of an amine antioxidant tends to result in a reduction in resistance to cracking at the groove bottom. More than 1.5% by mass thereof tends to cause deterioration in appearance although it can improve resistance to cracking at the groove bottom.

Examples of the quinoline antioxidants include a 2,2,4-trimethyl-1,2-dihydroquinoline polymer and 6-ethoxy-2,2,4-trimethyl-1,2-dihydroquinoline. Preferred among these is a 2,2,4-trimethyl-1,2-dihydroquinoline polymer (antioxidant TMQ).

The amount of quinoline antioxidant in the tread is 0.3 to 1.0% by mass, preferably 0.4 to 0.9% by mass. Less than 0.3% by mass of a quinoline antioxidant tends to result in a reduction in resistance to cracking at the groove bottom. More than 1.0% by mass thereof tends to have less increase in its effect.

The sum of the amounts of amine and quinoline antioxidants in the tread is not particularly limited, and is preferably 1.2 to 2.5% by mass, and more preferably 1.4 to 2.3% by mass. Less than 1.2% by mass of the sum of the amounts thereof tends to result in a reduction in resistance to cracking at the groove bottom. More than 2.5% by mass thereof tends to spoil appearance.

Any rubber component may be used in a rubber composition used for the preparation of the tread as long as the tread rubber component contains 3% by mass or more of a polybutadiene rubber (BR). Examples of rubber materials other than polybutadiene rubber that can be used in the rubber component include diene rubbers such as natural rubber (NR), butyl rubber (IIR), halogenated butyl rubber (X-IIR), and styrene-butadiene rubber (SBR). Preferred among these is SBR because SBR has high compatibility and costs low.

The amount of BR based on 100% by mass of the rubber component is 3% by mass or more, preferably 5% by mass or more. Less than 3% by mass of BR tends to result in a reduction in resistance to cracking at the groove bottom. The amount of BR based on 100% by mass of the rubber component is preferably 70% by mass or less, and more preferably 60% by mass or less. More than 70% by mass thereof tends to result in a reduction in wet grip performance.

The amount of SBR based on 100% by mass of the rubber component is preferably 30% by mass or more, more preferably 40% by mass or more, and still more preferably 50% by mass or more. Less than 30% by mass of SBR tends to result in deterioration in processability. The amount of SBR based on 100% by mass of the rubber component is preferably 98% by mass or less, and more preferably 95% by mass or less.

In addition to the aforementioned components, the rubber composition for forming the tread may contain any additives such as fillers (e.g. carbon black, silica), oils, tackifiers, vulcanizing agents, vulcanization accelerators, and vulcanization activators, as appropriate.

The rubber composition preferably contains carbon black as filler because carbon black can increase reinforcement and further improve abrasion resistance. Any carbon black may be used, such as GPF, FEF, HAF, ISAF, and SAF. The carbon black may be used alone or in combinations of two or more.

The amount of carbon black is preferably 2 parts by mass or more, more preferably 3 parts by mass or more, and still more preferably 5 parts by mass or more, for each 100 parts by mass of the rubber component. Less than 2 parts by mass of carbon black tends to have insufficient reinforceability. The amount of carbon black is preferably 50 parts by mass or less, more preferably 20 parts by mass or less, and still more preferably 10 parts by mass or less, for each 100 parts by mass of the rubber component. More than 50 parts by mass of carbon black tends to be difficult to disperse, resulting in poor rolling resistance properties.

Also, the rubber composition preferably contains silica as filler because silica can further improve rolling resistance properties while increasing reinforcement. Non-limiting Examples of the silica include silica produced by a wet process and silica produced by a dry process. The silica may be used alone or in combinations of two or more.

The amount of silica for each 100 parts by mass of the rubber component is preferably 10 parts by mass or more, more preferably 20 parts by mass or more, and still more preferably 30 parts by mass or more. Less than 10 parts by mass of silica tends to have insufficient reinforceability. The amount of silica is preferably 100 parts by mass or less, more preferably 80 parts by mass or less, and still more preferably 60 parts by mass or less. More than 100 parts by mass of silica tends to have reduced dispersibility, resulting in increased hysteresis loss and thus poor rolling resistance properties.

The silica may be used together with a silane coupling agent. Examples of the silane coupling agents include bis(3-triethoxysilylpropyl)tetrasulfide, bis(3-triethoxysilylpropyl)trisulfide, and bis(3-triethoxysilylpropyl)disulfide. Preferred among these is bis(3-triethoxysilylpropyl)tetrasulfide because it is highly effective in improving reinforcement.

These silane coupling agents may be used alone, or two or more of these may be used in combination.

The amount of silane coupling agent is preferably 1 part by mass or more, and more preferably 2 parts by mass or more, for each 100 parts by mass of silica. Less than 1 part by mass of a silane coupling agent tends to lead to an unvulcanized rubber composition having a high viscosity and thus poor processability. The amount of silane coupling agent is preferably 20 parts by mass or less, and more preferably 15 parts by mass or less, for each 100 parts by mass of silica. More than 20 parts by mass of a silane coupling agent tends to fail to give an effect corresponding to the increased cost.

The tread formed from the rubber composition has a rubber thickness between the groove bottom and the outermost belt-reinforcing layer of 0.1 to 2.0 mm, preferably 0.3 to 1.7 mm. The tread with a rubber thickness of smaller than 0.1 mm tends to easily suffer cracking at the groove bottom, whereas the tread with a rubber thickness of larger than 2.0 mm tends to be difficult to improve in fuel economy. The rubber thickness between the groove bottom and the outermost belt-reinforcing layer is indicated by the symbol A in FIG. 1.

Preferably, the tread includes a belt disposed radially outward of a carcass and extending in the tire circumferential direction, the belt including a belt layer, and at least one belt-reinforcing layer disposed radially outward of the belt layer, the belt layer including a cord forming an angle with the tire circumferential direction of 15 to 30 degrees, and the belt-reinforcing layer including an organic fiber cord forming an angle with the tire circumferential direction of 0 to 5 degrees. The presence of the belt layer can reduce distortion of the tread rubber at the tread groove bottom and thereby improve resistance to cracking at the groove bottom. Moreover, if the belt-reinforcing layer formed from an organic fiber is absent, then there will be a great difference in rigidity between steel belts and the rubber, as well as a great difference in thermal shrinkage rate between the metals and the rubber upon thermal shrinkage after vulcanization, likely resulting in a residual strain at the groove bottom due to thermal shrinkage.

FIG. 1 is a cross-sectional view showing the belt structure. A belt 6 includes a first belt layer 61 located on the radially inner side of the tire, and a second belt layer 62 located on the radially outer side. At least one belt-reinforcing layer 7 is disposed radially outward of the belt 6, or, in other words, radially outward of the second belt layer 62. Preferably, the cord forming the first belt layer 61 forms an angle with the tire circumferential direction of 15 to 30 degrees, the cord forming the second belt layer 62 forms an angle with the tire circumferential direction of 150 to 165 degrees, and the cord of at least one belt layer is an organic fiber cord. Also preferably, the belt-reinforcing layer 7 is formed from an organic fiber cord and is disposed such that the organic fiber cord forms an angle with the tire circumferential direction of 0 to 5 degrees.

The cord of the belt layer preferably forms an angle with the tire circumferential direction of 15 to 30 degrees, more preferably 20 to 27 degrees. With an angle smaller than 15 degrees, the tire tends not to have a good contact patch. With an angle greater than 30 degrees, cornering power tends to be reduced.

The cord of at least one belt-reinforcing layer disposed radially outward of the belt layer preferably forms an angle with the tire circumferential direction of 0 to 5 degrees, more preferably 0 to 4 degrees. With an angle greater than 5 degrees, the stability of steering linearity tends to be reduced.

Any organic fiber cord may be used, and examples thereof include polyester, nylon, rayon, and aramid.

The rubber composition for forming the tread can be prepared by a conventional method. Specifically, for example, the rubber composition may be prepared by kneading the aforementioned components using a kneading device such as a Banbury mixer, a kneader, and an open roll mill, and then vulcanizing the mixture.

The tire of the present invention can be produced by a conventional method using the aforementioned rubber composition. Specifically, the tire of the present invention can be produced as follows. The unvulcanized rubber composition containing the aforementioned components is extruded into a tread shape, assembled with other tire components and cords in a conventional manner on a tire building machine to build an unvulcanized tire. This unvulcanized tire is heat-pressed in a vulcanizer to provide a pneumatic tire.

EXAMPLES

The present invention will be described in greater detail by reference to, but not limited to, the examples below.

The following will describe the chemicals used in the examples and the comparative examples.

S-SBR: trade name "E10" (Asahi Kasei Corp., terminal group: amino acid; modification rate: 51% by mass; styrene content: 39% by mass; vinyl bond content: 31% by mass; Mw/Mn: 2.1)

BR: UBEPOL BR150B (Ube Industries, Ltd.)

Carbon black: N220 (Mitsubishi Chemical Corp.)

Silica: ULTRASIL VN3 (Degussa, $N_2SA$: 175 $m^2/g$)

Silane coupling agent: Si69 (Evonik Degussa, bis(3-triethoxysilylpropyl)tetrasulfide)

Wax: SUNNOC N (Ouchi Shinko Chemical Industrial Co., Ltd.)

Antioxidant (1): NOCRAC 6C (Ouchi Shinko Chemical Industrial Co., Ltd., N-1,3-dimethylbutyl-N'-phenyl-p-phenylenediamine)

Antioxidant (2) (heat-resistant antioxidant): NONFLEX RD (Seiko Chemical Co., Ltd., 2,2,4-trimethyl-1,2-dihydroquinoline polymer (TMDQ polymer))

Oil: JOMO PROCESS X140 (Japan Energy Corp.)

Stearic acid: stearic acid (NOF Corp.)

Zinc oxide: zinc oxide #1 (Mitsui Mining & Smelting Co., Ltd.)

Sulfur: sulfur powder (Tsurumi Chemical Industry Co., Ltd.)

Vulcanization accelerator (1): NOCCELER CZ (Ouchi Shinko Chemical Industrial Co., Ltd., N-cyclohexyl-2-benzothiazolylsulfenamide)

Vulcanization accelerator (2): NOCCELER D (Ouchi Shinko Chemical Industrial Co., Ltd., diphenylguanidine)

Examples 1 to 8 and Comparative Examples 1 to 6

According to each of the compositions shown in Table 1, the materials, except the sulfur and the vulcanization accelerators, were kneaded at 150° C. for three minutes using a 1.7-L Banbury mixer to provide a kneaded mixture. The sulfur and the vulcanization accelerators were then added to the kneaded mixture, and they were kneaded at 80° C. for three minutes using an open roll mill to provide an unvulcanized rubber composition. The unvulcanized rubber composition was press-vulcanized at 170° C. for 15 minutes to provide a vulcanized rubber composition.

Separately, the unvulcanized rubber composition thus prepared was formed into a tread shape, and assembled with other tire components on a tire building machine to build an unvulcanized tire. The unvulcanized tire was then press-vulcanized at 170° C. for 15 minutes, thereby providing a test tire (size: 215/45ZR17).

The band structures include the following carcass ply and belts.

Organic fiber carcass ply (organic fiber: polyester): two sheets

Steel belt (angle with tire circumferential direction: 26 degrees): two sheets

Organic fiber belt (angle with tire circumferential direction: 0 degrees, organic fiber: nylon): one sheet The performance of the unvulcanized rubber compositions, vulcanized rubber compositions, and test tires thus obtained was evaluated by the following tests.

<Rolling Resistance>

The rolling resistance was determined using a rolling resistance tester in the following conditions.

Rim: 15×6J

Internal pressure: 200 kPa

Load: 6.96 kN

Velocity: 80 km/h

The results are expressed as an index relative to Comparative Example 1. The lower the index is, the better the performance is.

<Cracking Resistance>

The (fresh) test tires of each example were mounted on the wheels of a vehicle (2000-cc, front-engine, front-wheel-drive car produced in Japan), and the vehicle was driven on a test track. After 30000 km of driving, the appearance of the tires was visually evaluated in accordance with the following criteria. Table 1 shows the results.

Grade 5: No crack observed even with a magnifying glass
Grade 4: A crack observed with a magnifying glass
Grade 3: A crack visually observed
Grade 2: Many cracks shorter than 1 cm visually observed
Grade 1: Many cracks of 1 cm or longer observed <Discoloration>

The (fresh) test tires of each example were mounted on the wheels of a vehicle (2000-cc, front-engine, front-wheel-drive car produced in Japan), and the vehicle was driven on a test track. After 30000 km of driving, the appearance of the tires was visually evaluated for presence of brown discoloration. Another set of test tires of the same example were prepared and stored in a warehouse. After one month of storage, the appearance of the tires was visually evaluated for presence of white discoloration. Table 1 shows the results.

TABLE 1

| | | Example No. Examples | | | | | | | |
|---|---|---|---|---|---|---|---|---|---|
| | | 1 | 2 | 3 | 4 | 5 | 6 | 7 | 8 |
| Composition (part(s) by mass) | S-SBR | 90 | 90 | 90 | 95 | 90 | 90 | 90 | 90 |
| | BR | 10 | 10 | 10 | 5 | 10 | 10 | 10 | 10 |
| | Carbon black | 5 | 5 | 5 | 5 | 5 | 5 | 5 | 5 |
| | Silica | 60 | 60 | 60 | 60 | 60 | 60 | 60 | 60 |

TABLE 1-continued

|  |  |  |  |  |  |  |  |  |  |
|---|---|---|---|---|---|---|---|---|---|
|  | Silane coupling agent | 6 | 6 | 6 | 6 | 6 | 6 | 6 | 6 |
|  | Wax | 1.94 | 1.94 | 1.94 | 1.94 | 2.9 | 1.94 | 1.94 | 2.9 |
|  | Antioxidant (1) | 1.94 | 1.94 | 1.94 | 1.94 | 1.94 | 2.3 | 1.94 | 2.9 |
|  | Antioxidant (2) | 0.78 | 0.78 | 0.78 | 0.78 | 0.78 | 0.78 | 1.5 | 1.5 |
|  | Oil | 10 | 10 | 10 | 10 | 10 | 10 | 10 | 10 |
|  | Stearic acid | 2 | 2 | 2 | 2 | 2 | 2 | 2 | 2 |
|  | Zinc oxide | 3 | 3 | 3 | 3 | 3 | 3 | 3 | 3 |
|  | Sulfur | 2.2 | 2.2 | 2.2 | 2.2 | 2.2 | 2.2 | 2.2 | 2.2 |
|  | Vulcanization accelerator (1) | 1 | 1 | 1 | 1 | 1 | 1 | 1 | 1 |
|  | Vulcanization accelerator (2) | 0.5 | 0.5 | 0.5 | 0.5 | 0.5 | 0.5 | 0.5 | 0.5 |
|  | Total | 194.4 | 194.4 | 194.4 | 194.4 | 195.3 | 194.7 | 195.1 | 197.0 |
| Proportion (%) | Wax | 1.00 | 1.00 | 1.00 | 1.00 | 1.48 | 1.00 | 0.99 | 1.47 |
|  | Antioxidant (1) | 1.00 | 1.00 | 1.00 | 1.00 | 0.99 | 1.18 | 0.99 | 1.47 |
|  | Antioxidant (2) | 0.40 | 0.40 | 0.40 | 0.40 | 0.40 | 0.40 | 0.77 | 0.76 |
|  | Sum of antioxidants | 1.40 | 1.40 | 1.40 | 1.40 | 1.39 | 1.58 | 1.76 | 2.23 |
| Belt structure |  | Present | Present | Present | Present | Present | Present | Present | Present |
| Groove bottom rubber thickness (mm) |  | 0.5 | 1 | 2 | 0.5 | 0.5 | 0.5 | 0.5 | 0.5 |
| Tire performance | Rolling resistance index | 92 | 93 | 95 | 92 | 92 | 92 | 92 | 92 |
|  | Cracking resistance | 4 | 5 | 5 | 3 | 5 | 5 | 5 | 5 |
|  | Discoloration | No | No | No | No | No | No | No | No |

|  |  | Example No. Comparative Examples ||||||
|---|---|---|---|---|---|---|---|
|  |  | 1 | 2 | 3 | 4 | 5 | 6 |
| Composition (part(s) by mass) | S-SBR | 90 | 90 | 100 | 90 | 90 | 90 |
|  | BR | 10 | 10 | 0 | 10 | 10 | 10 |
|  | Carbon black | 5 | 5 | 5 | 5 | 5 | 5 |
|  | Silica | 60 | 60 | 60 | 60 | 60 | 60 |
|  | Silane coupling agent | 6 | 6 | 6 | 6 | 6 | 6 |
|  | Wax | 1.94 | 1.94 | 1.94 | 6 | 1.94 | 1.94 |
|  | Antioxidant (1) | 1.94 | 1.94 | 1.94 | 1.94 | 4 | 1 |
|  | Antioxidant (2) | 0.78 | 0.78 | 0.78 | 0.78 | 0 | 2 |
|  | Oil | 10 | 10 | 10 | 10 | 10 | 10 |
|  | Stearic acid | 2 | 2 | 2 | 2 | 2 | 2 |
|  | Zinc oxide | 3 | 3 | 3 | 3 | 3 | 3 |
|  | Sulfur | 2.2 | 2.2 | 2.2 | 2.2 | 2.2 | 2.2 |
|  | Vulcanization accelerator (1) | 1 | 1 | 1 | 1 | 1 | 1 |
|  | Vulcanization accelerator (2) | 0.5 | 0.5 | 0.5 | 0.5 | 0.5 | 0.5 |
|  | Total | 194.4 | 194.4 | 194.4 | 198.4 | 195.6 | 194.6 |
| Proportion (%) | Wax | 1.00 | 1.00 | 1.00 | 3.02 | 0.99 | 1.00 |
|  | Antioxidant (1) | 1.00 | 1.00 | 1.00 | 0.98 | 2.04 | 0.51 |
|  | Antioxidant (2) | 0.40 | 0.40 | 0.40 | 0.39 | 0.00 | 1.03 |
|  | Sum of antioxidants | 1.40 | 1.40 | 1.40 | 1.37 | 2.04 | 1.54 |
| Belt structure |  | Absent | Absent | Present | Present | Present | Present |
| Groove bottom rubber thickness (mm) |  | 3 | 0.5 | 0.5 | 0.5 | 0.5 | 0.5 |
| Tire performance | Rolling resistance index | 100 | 92 | 92 | 92 | 92 | 92 |
|  | Cracking resistance | 5 | 1 | 1 | 5 | 5 | 5 |
|  | Discoloration | No | No | No | Whitened | Browned | Browned |

The tires of Comparative Examples 1 to 6 each fail to satisfy at least one of the requirements of wax, amine antioxidant, quinoline antioxidant, BR, and the rubber thickness between the tread groove bottom and the outermost belt-reinforcing layer. Thus, these tires were poor in terms of at least one of rolling resistance, cracking resistance, and discoloration. In contrast, the tires of Examples 1 to 8, which satisfy all of these requirements, maintained their appearance and resistance to cracking at the groove bottom and also exhibited improved fuel economy.

REFERENCE SIGNS LIST

T: pneumatic tire
A: rubber thickness between groove bottom and outermost belt-reinforcing layer
1: tread
6: belt
7: belt-reinforcing layer
8: groove
61: first belt layer
62: second belt layer

The invention claimed is:
1. A tire, said tire comprising a tread having a belt therein, the tread containing 0.9 to 1.5% by mass of a wax, 0.9 to 1.5% by mass of an amine antioxidant, 0.3 to 1.0% by mass of a quinoline antioxidant, and a tread rubber component containing 3% by mass or more of a polybutadiene rubber,
the belt being disposed radially outward of a carcass of the tire and extending in a tire circumferential direction, the belt comprising a belt layer comprising a cord forming an angle with the tire circumferential direction of 15 to 30 degrees and at least one belt-reinforcing layer disposed radially outward of the belt layer, said belt-reinforcing layer comprising an organic fiber cord forming an angle with the tire circumferential direction of 0 to 5 degrees, and the tread having a rubber thickness between a tread groove bottom and an outermost belt-reinforcing layer of 0.1 to 2.0 mm.

2. The tire according to claim 1,
wherein the amine antioxidant is N-1,3-dimethylbutyl-N'-phenyl-p-phenylenediamine.

3. The tire according to claim 1,
wherein the quinoline antioxidant is a 2,2,4-trimethyl-1,2-dihydroquinoline polymer.

* * * * *